United States Patent [19]
Winchell

[11] 3,809,463
[45] May 7, 1974

[54] ANIMATION CELLS AND TECHNIQUE

[76] Inventor: Paul Winchell, 20438 Moberly Pl., Canoga Park, Calif.

[22] Filed: June 28, 1972

[21] Appl. No.: 267,025

[52] U.S. Cl............ 352/51, 352/50, 352/87
[51] Int. Cl............ G03b 19/18, G03b 21/32
[58] Field of Search............ 352/38, 50, 51, 87, 46

[56] References Cited
UNITED STATES PATENTS

| | | | |
|---|---|---|---|
| 2,450,017 | 9/1948 | Place | 352/51 |
| 2,998,313 | 8/1961 | Maurer | 352/46 |
| 3,301,626 | 1/1967 | Maurer | 352/51 |

Primary Examiner—Samuel S. Matthews
Assistant Examiner—Russell E. Adams, Jr.
Attorney, Agent, or Firm—Donald D. Mon

[57] ABSTRACT

An animation process, and a cell for employment in said process wherein live actors and real, or substitute props used as "space savers," may be used to provide salient features and points of reference in an animation cell, so as directly to provide information to be displayed in the completed cell, or to provide dark lines for a painter who applies opacities thereto, and to a director who aligns overlays or underlays relative thereto.

16 Claims, 8 Drawing Figures

PATENTED MAY 7 1974 3,809,463
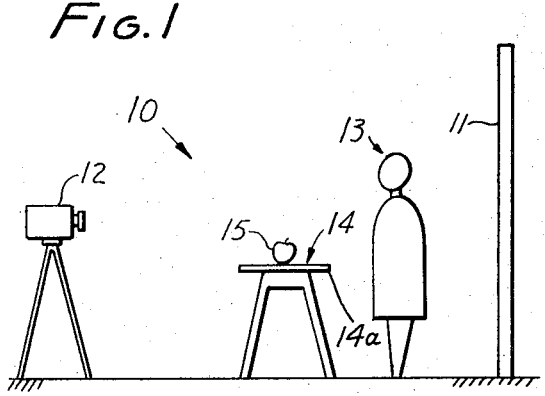
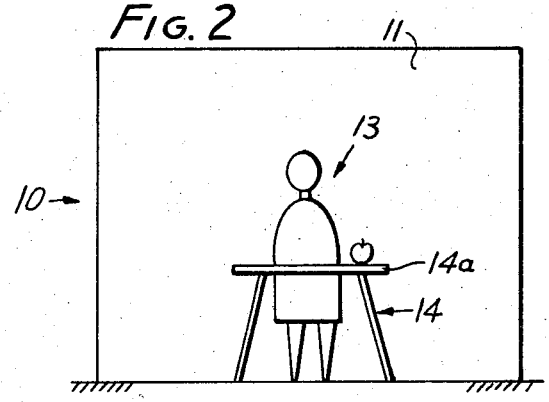
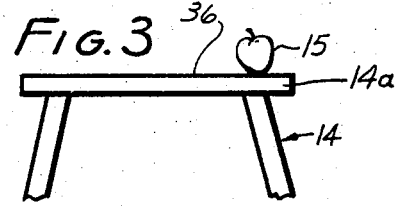
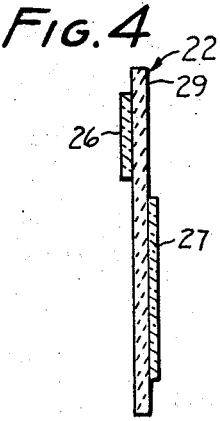
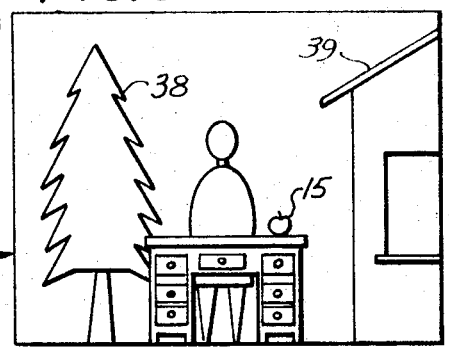
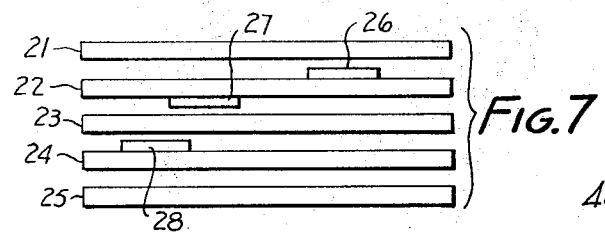
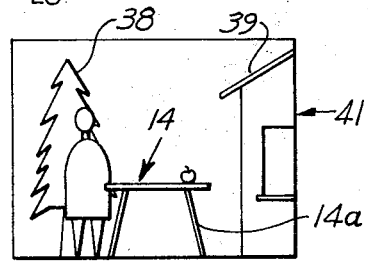

ANIMATION CELLS AND TECHNIQUE

This invention relates to the art of animation for motion pictures.

The classical technique for producing animated pictures is by the production of cells which are stacked up as on a background and the stack photographed from the top, to provide individual frames that are displayed sequentially at projector speeds. Each stack comprises a layered structure including an opaque background, and at least one cell which is at least partially transparent and which has opaque portions representative of foreground information. It may also include information which is foreground or background as to elements such as a character in the scene, all of which is foreground to the opaque background. In the prior art, the opacities are individually drawn by an artist and then the cells are stacked in layers so that their combined opacities and the background constitute the desired scene. For making sequential frames, the cells are altered, changed, or moved so as to simulate a spatial change from frame to frame, thereby producing an animated sequence. The process of the instant invention has as one of its objectives the production of such cells without requiring the services of an animator for drawing them.

In conventional animation techniques, one of the most tedious and expensive features of conventional animation resides in the preparation of cells which portray the characters, because each one requires a skilled artist to draw the entire character. This is time consuming work of an expensive workman known as an "animator". In fact, this type of cell has become so expensive that cartoon-type animation having substantial detail as to lip form, costume, motion, and change in position has been generally discontinued. Except for high-budget productions, animation now is limited to very elementary presentations in which lip and body movements are limited as to change from frame to frame.

Similarly, when there is a substantial movement of an element of the scene such as an automobile, its presentation in true perspective would change from stack to stack. The expense of drawing a cell for each stack to show a continuing change of perspective, for example following a car from a side view in the middle of the scene, through a corner view and finally to a rear view as it leaves the scene, has become so great that such refinements have gradually given way to the use of a side elevation which is simply moved back and forth across the scene from stack to stack. Of course the result is devoid of any claim to being an accurately representational screen, and merely becomes a symbolic presentation.

The foregoing shortcut techniques do produce an economical product, but they do not produce a visual product of excellent aesthetic quality. The audience must watch this simplified product because there is no economical substitute of higher quality.

It is an object of this invention to provide an animation technique in which actors and actual or substitute properties can be utilized in the direct preparation of cells. This technique requires only a painter (whose skills need not be those of the artistically-qualified artist known as the "animator". It provides the painter with sufficient detail so that on the back side he can expeditiously, and with the use of only little judgement and craft, paint the back surface to leave exposed certain exact details and to coat only specific selected areas. On the front side, the details give adequate guidance for application of paint where the details are to be obliterated, and also guidance to expedite the embellishment of other material on the front side. This technique is so effective that cells with truly representational information on them can be produced at costs which are economically competitive with inferior cells produced by the shortcut techniques discussed above. Where quality of product is a factor, this invention provides a sustantially improved product at competitive costs.

Because paint applied to the back side of a cell becomes an opacity which occludes information beneath (behind) it, there is no known process in which fanciful or arbitrarily selected backgrounds can be used in a stack with features of live actors. It is an object of this invention to provide an animation technique wherein an actor can be photographed in such a manner that his salient features will be presented on a transparent cell, for example his facial configurations, general posture, and location, while the surroundings are clear and transparent, and do not supply undesired background information. Such a cell can be assembled with other cells and with a background element in accordance with known animiation techniques.

It is still another object of this invention to provide an animation technique which enables an actor to work with arbitrarily selected properties which thereby act as "space-savers," and guides for his actions (i.e., — his hand resting on a table), whose salient outlines are presented as a guide to the painter or director, whereby in the completed stack, any other type of similarly-shaped property may be used instead, by way of overlay. An example is the use of a plain kitchen table in the photographic process, and its substitution by a period-type desk or some fanciful object in the completed stack. By means of this process, a cell which is strongly representational of an actor can be included in a stack which includes completely arbitrary foreground and background material. It constitutes an effective mixing of live action and animation derived from the original shots.

This invention thereby provides an inexpensive means to provide animation of very high quality and competitive cost, and is capable of providing modified protraiture of actual persons, with enhanced backgrounds and foregrounds. This process is also adaptable to the usage of existing footage of motion pictures for information input to animation cells, by making certain changes to an existing print, for example, erasing the backgrounds from the frame to form a cell for use in this process.

This invention is carried out by photographing a live actor or other discrete objects in space also having salient features in a field substantially devoid of background. The term "discrete object in space" means an object physically separate from its background, such as a property of an actor in front of and spaced from a backdrop. The term "substantially devoid of gackground" means the absence of background detail which would produce an image on the positive print used as a cell in the frame. Obviously, background might be present in such a situation, but still be of such nature as not to produce an image on the positive print. A white or pastel sheet or wall is an example. Also, the actor may dress in articles of clothing of colors that, will produce no substantial opacity, and the salient features of the actors and of "space-saving" props may be accentuated by coloring, applied to them, so as to provide opaque lines of emphasis, presentation, or guidance on the cell.

The product of the foregoing photographic step is a cell which is a transparent acetate sheet which bears an image, the characterizing feature being the elimination of all but the salient featues of actor and properties. "Salient features" will include general outlines, as well as characterizing or identifying elements, such as general shape, a familar smile or look, or posture. This cell is now ready for direct usage in a stack if the salient features as printed constitute sufficient detail for the purpose. The cell may also be painted on the front or on the back with opaque paint in such color or detail as the painter may wish to add. If applied to the back of the cell, the salient features themselves will constitute a part of the actual presentation. If applied to the front, the salient features will be used as a guide by the painter as to where to paint, The cell can now be assembled with a background sheet, and with other cells acting as overlays or underlays of scenery, props, or any other intended subject matter, and all can readily be indexed (The terms "indexed", "registered", and "registrable" are used synonymously to connote an alignment in a stack or frame) to the position of the properties or actors with the use of the salient features as guide means.

This invention will be fully understood from the following detailed description and the accompanying drawings in which:

FIG. 1 is a side elevation of a photographic arrangement used in the process according to the invention;

FIG. 2 is a left hand elevation taken in FIG. 1;

FIG. 3 shows certain modifications made to one of the properties in FIGS. 1 and 2;

FIG. 4 is a cross-section showing opacities applied to a cell;

FIG. 5 is a top view of a stack using a cell secured in the process of FIG. 1;

FIG. 6 is a top view of a stack including parts of FIG. 5, with its background modified by relative movement of one of its cells;

FIG. 7 is an edge view, exploded, of a group of cells forming a stack; and

FIG. 8 is a representation of a cell prepared according to the process of FIG. 1 showing the salient features of an actress, together with a property.

In FIG. 1 a set 10 is shown having a backdrop 11, a camera 12, an actor 13, and a property 14. In the example, the property is a table 14a with an apple 15 on it. In FIG. 2, this scene is shown as camera 12 will photograph it.

It is the object of the arrangement of FIG. 1 to provide the data for a cell which can be utilized together with a background sheet and perhaps also with additional cells to form a stack (sometimes called a "frame", which terms are used synonymously which will be photographed to form a frame for an animated motion picture sequence. An exploded representational showing of such a stack 20 is shown in FIG. 7 where transparencies 21, 22, 23, and 24, and a background sheet 25 (which is usually opaque), are shown aligned vertically above one another to form the completed stack. When the stack is photographed, the individual elements will be pressed under glass flat against one another. They are shown separated for convenience in disclosure.

The cells may have in themselves information or data. An example is the one obtained from the setup of FIG. 1. The cell is in the nature of a transparency with a positive image. The data or information will constitute an opacity inherent in the cell, and the remainder is transparent. In addition, there may be applied to these cells other opacities such as opacities 26, 27, and 28. Their thickness is exaggerated in the drawings. These latter opacities may be in the nature of overlays or underlays in the sense of being applied to the front or back surfaces of the sheet, respectively. Opacities 26 and 28 are overlays; and opacity 27 is an underlay, all in FIG. 7 as viewed from its top. In such an arrangement, opacities 26 and 28 will occlude and hide from view anything below themselves, including anything inherently shown in their own respective cell. Opacity 27, being an underlay will not occlude anything in its own cell but will occlude anything in or on cells or the background sheet which lie directly beneath it in the stack. It may constitute data in its own cell, for example coloration beneath the data inherent within cell 22, said data perhaps constituting salient features. Accordingly, looking down upon the stack of FIG. 7, there will be produced a representation of all of the data, including that inherent in the cell material itself, and that supplied by the opacities, which is not covered by an opacity of some kind that lies above it.

As stated above, the salient features which are developed in the positive print (i.e., cell) from the process by FIG. 1 are opacities. They are not applied by an artist, but instead are obtained as the consequence of a photographic and printing process. It is obvious that the colors of opacities may be arbitrarily selected, as may be their subject matter and shape.

FIG. 4 illustrates cell 22 in greater detail, there being a transparent sheet 29, with the overlay 26 and underlay 27 upon it. It is an object of this invention to produce, in or on the cell material, data which corresponds to the salient features of a scene without background, such as in FIG. 1. Because there is no background in it, such a cell can be used as an overlay over a background sheet, which is necessary if background is later to be added to the stack.

In order to secure a cell which contains substantially only salient features, the actors perform in front of a backdrop 11 which is a monotone of a color which will not print out on a positive print. White or pastels are examples of suitable colors. Subjects in front of such a backdrop will be visible on the cell to the exclusion of any background information.

Similarly, it is possible to eliminate much of the detail of the actor, (if desired) other than his salient features when the actor's own flesh colors are used, and when white clothing or pastel colored clothing is worn by him. Under such circumstances, prints such as shown in FIG. 8 will be obtained. Near the edges 30 of the actor's face or clothing, when the colors are different from the background, a positive print will usually produce a line.

Similarly, features which fall in shadow, such as nostrils 31, the edge of nose 32, and the eyes 33 will appear. Should greater detail be desired, then the salient features may be accentuated by applying darkly colored makeup to the actor's face. For example, lips may be outlined or colored over the full area, crease lines or eye outlines may be drawn as lines to provide an image of the line itself on the positive print. Thus, salient features may comprise lines, outlined areas, or even darkly colored areas on the final cell.

For example, in the picture shown, lines 34 for the eyebrows may be accentuated by dark makeup on the actor, as may lines 35 outlining the lips. Now when the actor performs, these accentuated lines will appear as an opaque image on a positive print without much detail around them. These features act as a direct guide to the painter when he applies foreground information on it. A flower 36 is shown as an example of a property which can be utilized by the factor and whose salient features are also shown in the cell.

The term "salient feature" is used to connote any distinctive or characterizing line, structure, edge, or area which it is desired to utilize for information in positioning or presentation. In an actor, the general outlines of posture, mannerisms, portions of the body such as the hands which are expressive and representational, or portions of the face, such as eyebrows, mouth and the like are regarded as salient features.

As to properties, FIG. 3 illustrates a means for accentuating locations objects in a cell, using salient features as guide mesns, even though much of the property involved may not remain visible in the final cell. In this case, table 14a has black tape or painted lines around the edges. Such lines may readily be applied with a paint roller, simply rolling it along the edge to be accentuated. When a salient feature such as the edge appears in the final cell, it will either illustrate the shape of the property itself, or will act as a positioning guide for substitutions of different images in place of said property as will later be discussed.

Further, with respect to FIG. 3, there is shown an apple 15 atop the table. The actor may perform before the camera utilizing this or any other properties, and all of his features and bodily parts will be related strictly to these properties. In the ultimate presentation as to the actor himself, only the salient feature of the property will be shown, and, of course, these may be replaced by overlaid information which can readily be located by the showing in the cell or which may directly be used if the actual prop is utilized. The actual property would then have acted as a "space-saver," the actor having been excluded from positions which would be inconsistent with the presence of an object in that location.

FIGS. 5 and 6 show some of the usages of the cell derived from the process of FIGS. 1 and 2. In FIG. 5, a cell from FIG. 1 is included in a stack 40 which includes underlays. Cell 22 is transparent except where the salient feature data is presented. The actor is standing directly behind the table and there has been added by means of underlays, such as underlays 23, 24, and by background sheet 25 (which is opaque), additional information such as a tree 38 and a house 39. This is an arbitrary background and any different fanciful background may be used instead.

In FIG. 6, a subsequent stack 41 is shown, wherein the actor has moved to one side of the table, but the background remains the same. It will be noted that all features of the actor are properly related to the table and to the apple.

Should it be desired to substitute properties, for example a desk for the simple table which is shown, it is provided as an overlay such as an opacity on cell 21.

Such an arrangement is shown in FIG. 5. It is readily guided to its proper position by reference to the salient features, i.e. the edge lines, of the table as they appear in cell 22 as dark lines, which appear as a consequence of having painted the edges of the table.

Similarly, the features of an actor are readily utilized in this system. The rendering of FIG. 8 shows the salient features of an actress such as would be produced in the process of FIG. 1. Her identity is readily apparent from certain salient features, in this case lines of facial structure. With underlying opacities, such as opacity 27, these features in and of themselves may constitute sufficient display for many animation purposes, and are quite exact and realistic. If, however, fuller lip presentations, or changes are to be made, then these may be added by painting an overlay 26, which, while it may obliterate the salient features as prsented in the cells, can very speedily be applied simply by painting over the data shown, using these features for guidance. This requires no artistry on the part of the painter because there is nothing for him skillfully to draw to specific detail. Such detail is presented entirely by the salient features in the cell. For this reason, a painter rather than an animator can be used, and the results secured are much more realistic and life-like.

Accordingly, this invention produces cells for animation by photographing an actor in a field in which background is eliminated, preferably entirely, in the photographic process by working against a background which does not reproduce or which will disappear either in the initial photographic step or in a sequential printing step (which is regarded as part of the photographic process herein). The production of the salient features requires only routine photography and positive printing steps, such that the undesired background is either not present initially, or dissappears in the photographic process (including pringing). The process is one which will eliminate all but the pronounced lines or areas in a black and white picture, and of course, these pronounced lines may themselves be created on the actor by accentuating with makeup on his face, body or clothing the salient features desired to be retained for latter embellishment, or by painting the edges or other salient features of properties to be used in the presentation. It is noted that salient features are not limited to lines - areas may also constitute such features. However, in general, lines will more commonly be generated.

The presently-preferred technique of this invention is to utilize a positive print, and to project it onto a xerographic processs metal plate which will produce the positive image on a transparent acetate sheet. An opaque powder is applied xerographically to an acetate sheet and when fused thereto constitutes a positive image inherent in the sheet which constitutes the cell.

The use of a live actor, together with a framework of reference such as a table (which might instead be an automobile or any other desired item) enables the animation sequence to be made independently of story boards. The actor simply performs in the field relative to such properties or guidance means as are provided. Then, relying upon this basic scene or framework, the director need only fill in around it with standard background situations or applied overlays or underlays, using the salient features as the guidance in the manner set forth above.

It is possible to utilize existing motion picture frames in this process, and to use data from them to make new products. For such a purpose, one would take existing black and white prints, make a xerographic transparent cell as stated above, and, utilizing alcohol or any suitable solvent, selectively remove the background from it, thereafter utilizing this cell to form a frame. Then, this resulting modified or cell may be processed to a high contrast positive print bearing the salient features, and this used as a cell to be worked into a new story with new foregrounds and backgrounds, as with cell 22.

It is also possible to provide the actor with additional features which may be displayed as salient features to aid in the animation sequence. For example, if the actor's features are to be changed, such as by the addition of a putty nose, or even by the wearing of a face mask, these may be added by putting them on the actor, and emphasizing the salient features if necessary. In every case the fanciful portion of the rendition will appear on the cell as a consequence of the actor's performance, rather than as a consequence of an animator's functions.

It may also be noted that more complicated properties, such as automobiles and the like may be followed across a set or film, just as is the actor. Its features, which will usually be the outline of the vehicle and its windows, may readily be manipulated by the director without requiring the services of an animator to produce perspective drawings. Therefore, perspective view in sequential frames can profitably return to animation.

This invention thereby enables animation techniques to be rendered fully representational, with direct presentation of salient data, or with indirect guidance for the substitution of other information. It provides precise guidance for the placement of underlay and overlay material, and for embellishment of the salient features. This process enables live actors to perform on sets of spartan simplicity, and accommodates the latter addition of fanciful information without requiring that fanciful properties even be manufactured, much less used. It enables a very active, highly representational presentation to be made at a cost competitive with high grade animation techniques, and in many applications also competitive with shortcut techniques. Certainly its product is of a very much higher quality than either of these techniques and results in a product of uncanny realism in its.

This invention is not to be limited by the embodiments shown in the drawings and described in the description, which are given by way of example and not of limitation but only in accordance with the scope of the appended claims.

I claim:

1. The method of making cells for use in constituting frames of an animated motion picture consisting of the following steps:
    a. making a series of negative images of a discrete object in space having salient features by photographing said object in a field substantially devoid of background; and
    b. using said negative images to produce corresponding positive images of said salient features of the object as photographed in step (a) on corresponding registrable otherwise transparent sheets.

2. The method of claim 1 in which the negative images in step (a) are fixed on film.

3. The method of claim 2 in which the film is black and white film.

4. The method of claim 3 in which the object is an actor, and in which the actor is clothed at least in part with clothing of white or pastel color.

5. The method of claim 1 in which the salient features of the object are delineated on the object with a color which will constitute an opacity on said transparent sheets.

6. The method of claim 5 in which the negative images in step (a) are fixed on film.

7. The method of claim 5 in which the film is black and white film.

8. The method of claim 1 in which the positive images are high contrast image whereby to provide substantially only the salient features on the transparent sheets.

9. The method of claim 1 in which the object is an actor.

10. The method of claim 1 in which an opacity is applied to the transparent sheets, using the salient features as guidance means.

11. The method of claim 1 in which another cell bearing an opacity is laid atop one of said cells using the salient features therein as guidance means.

12. The method of claim 1 in which the positive image on each transparent sheet is applied by xerography.

13. A cell for use in constituting a frame of an animated motion picture comprising a transparent sheet bearing an opaque positive image of salient features of an object said cell produced by the process consisting of the following steps:
    a. making a negative image of a discrete object in space having salient features by photographing said object in a field substantially devoid of background; and
    b. using said negative image, producing a positive image of said salient features of the object as photographed in step (a) on a registrable otherwise transparent sheet.

14. A cell according to claim 13 in which an additional opacity is applied to a surface thereof, the salient features comprising guidance means therefore.

15. A cell according to claim 14 in which the additional opacity is an underlay, the overlaying salient features remaining visible.

16. A cell according to claim 14 in which the additional opacity is an overlay, the underlaying salient features being occluded by it.

* * * * *

UNITED STATES PATENT OFFICE
CERTIFICATE OF CORRECTION

Patent No. 3,809,463     Dated May 7, 1974

Inventor(s) PAUL WINCHELL

It is certified that error appears in the above-identified patent and that said Letters Patent are hereby corrected as shown below:

| | |
|---|---|
| Col. 1, line 9, | after "speeds." insert --The word "cell" as used herein is frequently spelled "cel" in this art, and wherever "cell" or "cells" appears, the spelling "cel" or "cels" is completely synonymous.-- |
| Col. 1, line 37, | cancel "very" |
| Col. 1, line 64, | "the" first occurrence should read --an-- |
| Col. 1, line 64, | after '"animator"' close parenthesis |
| Col. 1, line 66, | "judgement" should read --judgment-- |
| Col. 2, line 15, | after "which" insert --a cel containing-- |
| Col. 2, line 30, | '"space-savers,"' should read --"space-savers",-- |
| Col. 2, line 59, | "of" should read --or-- |
| Col. 2, line 60, | "gackground" should read --background-- |
| Col. 2, line 67, | cancel the comma |
| Col. 3, line 3, | cancel the first comma |
| Col. 3, line 7, | cancel "acetate" |
| Col. 3, line 59, | after "synonymously" close parenthesis |
| Col. 5, line 10, | before "act" insert --will-- |
| Col. 5, line 13, | "factor" should read --actor-- |
| Col. 5, line 25, | "mesns" should read --means-- |
| Col. 5, line 45, | '"space-saver,"' should read --"space-saver",-- |
| Col. 6, line 51, | cancel "process" |
| Col. 7, line 8, | after "modified" insert --picture-- |
| Col. 7, line 40, | "latter" should read --later-- |
| Col. 7, line 49, | insert a period after "realism" and cancel "in its" |
| Col. 8, line 3, | "image" should read --images-- |
| Col. 8, line 2)<br>Col. 8, line 32, | insert comma after "cells" |
| (Cl. 11, line 2)<br>Col. 8, line 40<br>(Cl. 13, line 4) | insert comma after "object" |

Signed and Sealed this twenty-sixth Day of August 1975

[SEAL]

Attest:

RUTH C. MASON        C. MARSHALL DANN
*Attesting Officer*        *Commissioner of Patents and Trademarks*